United States Patent
Riezebos et al.

(10) Patent No.: US 9,825,673 B2
(45) Date of Patent: Nov. 21, 2017

(54) CONTACTLESS PLUG CONNECTOR AND CONTACTLESS PLUG CONNECTOR SYSTEM

(71) Applicants: TE Connectivity Nederland BV, 'S-Hertogenbosch (NL); Tyco Electronics AMP GmbH, Bensheim (DE)

(72) Inventors: Dirk-Jan Riezebos, Elst (NL); Bert Bergner, Bensheim (DE); Gied Habraken, Valkenswaard (NL)

(73) Assignees: TE Connectivity Nederland BV, 'S-Hertogenbosch (NL); TE Connectivity Germany GmbH, Bensheim (DE)

(*) Notice: Subject to any disclaimer, the term of this patent is extended or adjusted under 35 U.S.C. 154(b) by 805 days.

(21) Appl. No.: 14/351,091

(22) PCT Filed: Oct. 10, 2012

(86) PCT No.: PCT/EP2012/070019
§ 371 (c)(1),
(2) Date: Apr. 10, 2014

(87) PCT Pub. No.: WO2013/053731
PCT Pub. Date: Apr. 18, 2013

(65) Prior Publication Data
US 2014/0252876 A1   Sep. 11, 2014

(30) Foreign Application Priority Data
Oct. 13, 2011  (EP) .................... 11185079

(51) Int. Cl.
*H04B 5/00*   (2006.01)
*H01R 13/66*  (2006.01)
(Continued)

(52) U.S. Cl.
CPC ........ *H04B 5/0037* (2013.01); *H01F 38/14* (2013.01); *H01Q 1/2291* (2013.01);
(Continued)

(58) Field of Classification Search
CPC .. H04B 5/0037; H04B 5/0031; H04B 5/0075; H04B 5/0087; H04B 5/0093;
(Continued)

(56) References Cited

U.S. PATENT DOCUMENTS 6,476,520 B1    11/2002  Bohm et al.
6,950,633 B2 *   9/2005  Kojima ............... H01F 38/18
                                                333/260

(Continued)

FOREIGN PATENT DOCUMENTS

CN    1965451    5/2007
DE    2609076    9/1977
(Continued)

OTHER PUBLICATIONS

First Office Action issued by the Chinese Patent Office, (English translation attached), dated Nov. 30, 2015, for related Chinese Patent Application No. 2012800610707, 23 pages.
(Continued)

*Primary Examiner* — Ryan Johnson
(74) *Attorney, Agent, or Firm* — Faegre Baker Daniels LLP (57) ABSTRACT

The invention relates to contactless plug connectors and contactless plug connector systems for electromagnetically connecting a correspondrng mating plug connector. In order to allow for an electromagnetic connection, the invention suggest providing at least one antenna element arranged within the mating end of the contactless plug connector to transmit and/or to receive radio waves modulated with a predetennined carrier frequency, a transmitting/receiving
(Continued)

circuit for modulating an inputted baseband input signal onto the predetermined carrier frequency and transmitting the modulated baseband input signal and/or for demodulating a received radio wave into a baseband output signal. In particular, the contactless plug connector and contactless plug connector system include a securing element for securing the mating end of the contactless plug connector at close proximity to a corresponding mating end of the mating connector such that an electromagnetic connection can be established with the corresponding mating connector.

10 Claims, 6 Drawing Sheets

(51) Int. Cl.
| | |
|---|---|
| *H02J 5/00* | (2016.01) |
| *H01F 38/14* | (2006.01) |
| *H01Q 1/22* | (2006.01) |
| *H02J 50/10* | (2016.01) |
| *H01Q 7/04* | (2006.01) |

(52) U.S. Cl.
CPC ..... *H01R 13/6658* (2013.01); *H01R 13/6691* (2013.01); *H04B 5/0031* (2013.01); *H04B 5/0075* (2013.01); *H04B 5/0087* (2013.01); *H01Q 7/04* (2013.01); *H01R 2201/02* (2013.01); *H02J 50/10* (2016.02)

(58) Field of Classification Search
CPC ............... H01R 13/665; H01R 13/6658; H01R 13/6691; H01R 2201/02; H01R 13/66; H01R 13/6633; Y10S 439/95; H01F 38/14; H02J 50/10
See application file for complete search history.

(56) References Cited

U.S. PATENT DOCUMENTS

| | | | | |
|---|---|---|---|---|
| 7,598,923 | B2* | 10/2009 | Hardacker | .............. H01P 1/042 343/872 |
| 2004/0155723 | A1 | 8/2004 | Koriyama | |
| 2008/0238688 | A1* | 10/2008 | Rofougaran | ......... H04B 5/0012 340/572.7 |
| 2009/0102724 | A1 | 4/2009 | Tsutsumi | |
| 2011/0076944 | A1 | 3/2011 | Mihota | |
| 2011/0092174 | A1 | 4/2011 | Choi et al. | |
| 2011/0221389 | A1 | 9/2011 | Won | |
| 2013/0109317 | A1 | 5/2013 | Kikuchi | |

FOREIGN PATENT DOCUMENTS

| | | |
|---|---|---|
| DE | 19621003 A1 | 11/1997 |
| EP | 0323614 A2 | 7/1989 |
| EP | 0394714 A2 | 10/1990 |
| EP | 0523271 A1 | 1/1993 |
| EP | 2280489 | 2/2011 |
| GB | 2404094 | 1/2005 |
| WO | WO 2006/013638 | 2/2006 |

OTHER PUBLICATIONS

International Search Report and Written Opinion issued by the European Patent Office, dated Jan. 23, 2013, for International Application No. PCT/EP2012/070019; 9 pages.
Extended European Search Report issued by the European Patent Office, dated Mar. 14, 2012, for European Application No. 11185079.8; 6 pages.
International Preliminary Report on Patentability issued by the International Bureau of WIPO, dated Apr. 15, 2014, for International Application No. PCT/EP2012/070019; 6 pages.
International Search Report and Written Opinion issued by the European Patent Office, dated Jan. 24, 2013, for International Application No. PCT/EP2012/069974; 11 pages.
Extended European Search Report issued by the European Patent Office, dated Mar. 12, 2012, for priority Application No. 11185081.4; 6 pages.
International Preliminary Report on Patentability issued by the International Bureau of WIPO, dated Apr. 15, 2014, for International Application No. PCT/EP2012/069974; 7 pages.
International Preliminary Report on Patentability issued by the International Bureau of WIPO, Geneva, Switzerland, dated Apr. 15, 2014, for International Application No. PCT/EP2012/070019; 6 pages.
International Search Report and Written Opinion issued by the European Patent Office, dated Jan. 23, 2013, for International Application No. PCT/EP2012/070019; 11 pages.
Extended European Search Report issued by the European Patent Office, dated Mar. 14, 2012 for priority Application No. 11185079.8; 6 pages.

* cited by examiner

CONTACTLESS PLUG CONNECTOR AND CONTACTLESS PLUG CONNECTOR SYSTEM

BACKGROUND

The invention relates to a contactless plug connector for electromagnetically connecting a corresponding mating connector. In particular, the invention provides a contactless plug connector and contactless plug connector system including a transmitting circuit and/or receiving circuit for transmitting and/or receiving a radio wave of a predetermined carrier frequency.

Generally, the invention relates to contactless plug connectors for data transmissions. A contactless plug connector of the invention may, for instance, comply with known connection interface standards, for instance, Ethernet, USB, CAN, IO-link and RS485. Alternatively or in addition, the contactless plug connector of the invention may be utilized for industrial devices such as robots, material handling systems, injection molding devices, mining & harvesting equipment and transportation vehicles amongst others and for portable data processing devices such as mobile phones, mobile storage units, mobile music players, mobile video presentation devices, namely for allowing data and power connections under hostile environmental influences.

Industrial devices often rely on cables and connectors, operating in a hostile environment, which wear and tear and do not allow for rotation limiting the freedom of movements of these devices.

Portable data processing devices have evolved in the past from quasi stationary laptop computers to mobile devices allowing for an indoor and outdoor usage. Due to the portability, mobile devices are carried around and are thereby exposed to hostile environmental influences, e.g. dust, dirt, humidity, rain, acid liquids, heat, cold, shock and mechanical stress. In this respect, the connectors of a mobile device, positioned at the boundary between an outside and an inside of the mobile device, require adaptation to the newly diversified operating environments.

For a long time, plug connectors have been realized as electrical connectors wherein an electrical contact is established between the plug connector and a corresponding mating connector, i.e. receptacle connector.

However, electrical connections are limited to a direct connection between two electrical contacts and the tolerance regarding misalignment between contacts is not very high. Dust, dirt, shock and mechanical stress may adversely effect the establishment of an electrical connection between plug connector and receptacle connector.

Electrical connections are also sensitive to humidity e.g. rain as water may short-circuit electrical contacts in an unintended manner. Further, environmental influences may also deteriorate the contact surface reducing the conductivity of the connector in a mated state.

Accordingly, electrical connectors, though reasonable for an indoor operating environment, are disadvantageous for portable devices operable under more hostile environmental influences.

In the recent past, wireless interfaces have become popular for mobile devices as they overcome disadvantages inherent to an electrical connection. Radio waves do not require a direct contact (i.e. electrical connection). Accordingly, mobile devices have been designed to incorporate the appropriate radio wave transceiver modules in the housing of the mobile device. In particular, by sealing transceiver modules and other electrical circuits within the housing of a mobile device, it is possible to also established data connections with a mobile device under hostile environmental influences.

However, wireless connections are adversely affected by electromagnetic interference. In general, electromagnetic interference is prevalent for wireless connections spanning large distances, e.g. 20 to 100 m. In order to bridge large distances with a wireless connection, wireless transceiver modules have been adapted by increasing the transmit power. Although a higher transmit-power enables reception at large distance, the mutual electromagnetic interference between mobile devices of a same type using a same electromagnetic connection is disadvantageous.

In this respect, transmission control protocols have been introduced to prevent from plural transmissions at a same point in time on a same frequency using said high transmit power. However, wireless connections employing transmission control protocols are disadvantageous over electrical connections as they require a high signaling and processing overhead. Further, the transmission control protocols cannot provide a transparent connection between mobile devices since the signaling and processing overhead adds a considerable delay to the connection.

In other words, due to the above described disadvantageous of the wireless connections, for indoor environments electrical plug connectors may be regarded more versatile in terms of transparent connection establishment.

SUMMARY

The object underlying the invention is to propose a contactless plug connector which reduces susceptibility to hostile environmental influences and thereby overcomes commonly known disadvantages of electrical connectors such as e.g. corrosion, fretting, contact force and plating.

Another object of the invention is to suggest a contactless plug connector which eliminates a ground connection overcoming the conventional need for ground loop compensation circuits.

A further object of the invention is to suggest a contactless plug connector which can ensure highly reliable and robust data connectivity with good signal integrity.

At least one of these objects is solved by the subject matter of the independent claims. Advantageous embodiments are subject to the dependent claims.

A first aspect of the invention is to suggest a contactless plug connector which enables an electromagnetic connection to a corresponding mating connector with the mating end of the contactless plug connector being secured at close proximity to the corresponding mating connector.

For providing an electromagnetic connection, the contactless plug connector includes at least one antenna element for transmission and/or reception of radio waves. The radio waves are modulated with a predetermined carrier frequency. Modulation and/or demodulation is performed by a transmitting/receiving circuit also included in the contactless plug connector.

For modulation, the transmitting/receiving circuit receives an input baseband signal and converts the input baseband signal onto a predetermined carrier frequency. For transmission, the modulated input baseband signal is provided by the transmitting/receiving circuit to the at least one antenna element. For demodulation, a radio wave received via one of the at least one antenna element and converted the received radio wave into a baseband output signal to be provided to an output.

For securing the contactless plug connector at close proximity to the corresponding mating connector, the contactless plug connector further includes a securing element.

The securing element allows for an electromagnetic connection to be established with the corresponding mating connector.

It can be readily appreciated that the securing element does not require the mating end of the contactless plug connector to abut the respective mating end of the corresponding mating connector but allows for a gap therebetween. Accordingly, the electromagnetic connection is easier and more robustly establish-able and allows for connectivity under hostile environmental influences.

According to one exemplary implementation of the invention a contactless plug connector for electromagnetically connecting a corresponding mating connector is provided. The contactless plug connector comprises: at least one antenna element arranged within the mating end of the contactless plug connector and adapted to transmit and/or to receive radio waves modulated with a predetermined carrier frequency; a transmitting/receiving circuit for modulating an inputted baseband input signal onto the predetermined carrier frequency and transmitting the modulated baseband input signal via one of the at least one antenna element; and/or for demodulating a radio wave, received via one of the at least one antenna element, into a baseband output signal; and a securing element for securing the mating end of the contactless plug connector at close proximity to a corresponding mating end of the mating connector such that an electromagnetic connection can be established with the corresponding mating connector.

According to a more detailed embodiment, the securing element is adapted to secure the mating end of the contactless plug connector to the corresponding mating connector with a distance tolerance (d1) of no more than the height of the surface of the mating end of the contactless plug connector.

In another more detailed embodiment, the contactless plug connector further comprises: a printed circuit board (PCB) on which the at least one antenna element and the transmitting/receiving circuit are mounted. The PCB is arranged within the contactless plug connector at close proximity to the mating end of the contactless plug connector.

In a further more detailed embodiment, a first of the at least one antenna element is adapted to transmit radio waves modulated with a first predetermined carrier frequency; and a second of the at least one antenna element is adapted to receive radio waves modulated with a second predetermined carrier frequency; and the transmitting/receiving circuit is adapted to modulate an inputted baseband input signal onto the first predetermined carrier frequency and transmit the modulated baseband input signal via the first antenna element; and to demodulate a radio wave with the second predetermined carrier frequency, received via the second antenna element, into a baseband output signal. Thereby, simultaneous transmission and reception operations are allowed for via the two antenna elements without interference therebetween.

According to an alternative more detailed embodiment, the at least one antenna element is adapted to transmit and to receive radio waves modulated with the predetermined carrier frequency; and the transmitting/receiving circuit is adapted to alternatively (i) modulate and transmit an inputted baseband input signal, or (ii) receive and demodulate a radio wave with the predetermined carrier frequency according to a pre-defined time schedule enabling a transmission and a reception operation via the same antenna element without interference therebetween.

According to another more detailed embodiment the PCB is arranged longitudinally within the contactless plug connector so as to subdivide a cross section of the mating end of the contactless plug connector into two segments; and a first and a second of the at least one antenna element are mounted on opposite sides of the PCB, preferably such that: one of the two segments includes the first antenna element being adapted to transmit radio waves modulated with the first predetermined carrier frequency, and the other of the two segments includes the second antenna element being adapted to receive radio waves modulated with the first predetermined carrier frequency. The transmitting/receiving circuit is adapted to modulate an inputted baseband input signal onto the first predetermined carrier frequency and transmit the modulated baseband input signal via the first antenna element; and to demodulate a radio wave with the first predetermined carrier frequency, received via the second antenna element, into a baseband output signal.

In a further more detailed embodiment, the PCB includes a layer realizing a conductive ground plane in an area of the PCB where the first and the second antenna element are mounted on opposite sides so as to shield the first antenna element from the second antenna element and vice versa.

Furthermore, in a more detailed embodiment, the PCB is arranged within the contactless plug connector such that the plane defined by a portion of the PCB is approximately parallel to the front face of the mating end of the contactless plug connector, and a first and a second of the at least one antenna element are mounted at a second predefined distance (d2) on the portion of the PCB, the first antenna element being adapted to transmit radio waves modulated with a first predetermined carrier frequency, the second antenna element being adapted to receive radio waves modulated with the first predetermined carrier frequency; and preferably the transmitting/receiving circuit is adapted to modulate an inputted baseband input signal onto the first predetermined carrier frequency and transmit the modulated baseband input signal via the first antenna element; and to demodulate a radio wave with the first predetermined carrier frequency, received via the second antenna element, into a baseband output signal.

In another more detailed embodiment, the contactless plug connector comprises an inductive coupling element for transmitting/receiving power to/from a corresponding mating connector; and wherein the inductive coupling element is arranged at the mating end of the contactless plug connector so as to form in the secured state an induction loop with a corresponding inductive coupling element of the mating connector.

In a more detailed embodiment, the transmitting/receiving circuit is connected to the inductive coupling element.

According to a further more detailed embodiment, the inductive coupling element includes: a coil with a predetermined diameter, and a ferrite element having an u-shaped cross-section and being arranged to surround the coil so as to enhance the transmission/reception of power to/from a corresponding mating connector; and wherein the securing element is adapted to secure the mating end of the contactless plug connector to the corresponding mating connector with a lateral misalignment tolerance of no more 25% of the coil diameter.

In another embodiment, the contactless plug connector is provided as a radial connector; the securing element is adapted to allow the contactless plug connector to be secured in a rotated state to the corresponding mating connector; and the at least one antenna element is adapted to transmit and/or to receive radio waves with a circular polarization.

In a more detailed embodiment, a first of the at least one antenna elements is adapted to transmit and/or receive radio waves with a left-handed polarization and a second of the at least one antenna elements is adapted to receive and/or transmit radio waves with a right-handed polarization.

A further exemplary implementation of the invention provides a contactless plug connector system comprising a contactless plug connector according to one of the previously described embodiments and a corresponding mating connector, wherein, in the secured state, the at least one antenna element of the contactless plug connector being secured at the predetermined distance to corresponding mating connector so as to allow for an electromagnetic connection with the corresponding mating connector.

The accompanying drawings are incorporated into the specification and form a part of the specification to illustrate several embodiments of the present invention. These drawings, together with a description, serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and advantages will be become apparent from the following more particular description of the various embodiments of the invention as illustrated in the accompanying drawings, in which like references refer to like elements, and wherein:

DETAILED DESCRIPTION

Figure 1A:
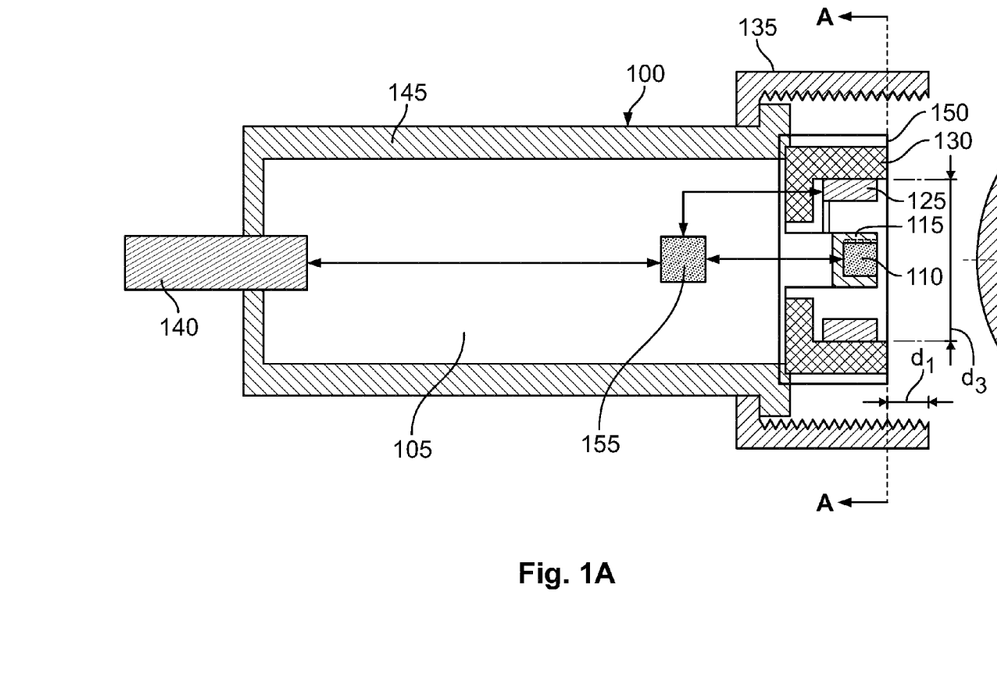
FIGS. 1a and 1b schematically shows a sectional view of a contactless plug connector and a cross-section of the exemplary contactless plug connector along the line A-A according to an exemplary embodiment of the invention.

Referring to FIG. 1a, a sectional view of a contactless plug connector according to an exemplary embodiment of the invention is shown. Further, FIG. 1b illustrates a cross-section of the contactless plug connector of FIG. 1a along the line A-A.

The contactless plug connector of this embodiment may be used for data connections complying with known transmission standards, for instance, Ethernet, USB, CAN, IO-link and RS485. The corresponding mating connector may be realized as a plug connector or as a receptacle connector (i.e. socket connector).

Figure 1B:
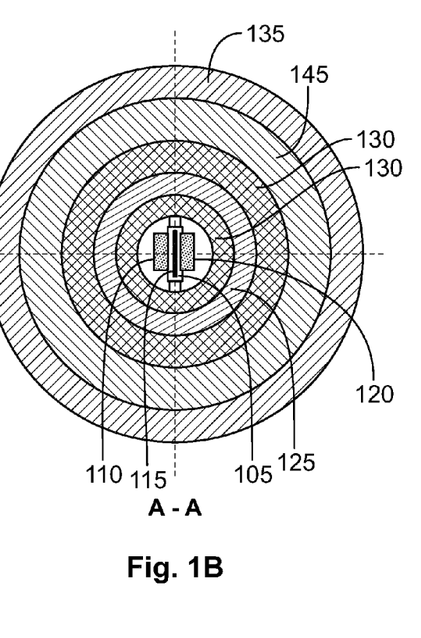

The contactless plug connector 100 of the embodiment shown in FIGS. 1a and 1b comprises at least one antenna element 110, optionally a second antenna element 120, and a transmitting and/or receiving circuit 155. Further, FIG. 1a shows an input/output 140 for input of the baseband input signal to the transmitting/receiving circuit 155 and/or output of the received radio wave signal from the transmitting/receiving circuit 155.

Depending on the type of connection for which the contactless plug connector is configured, the input/output 140 may be adapted for one or more input/output signal(s). For instance, the USB standard specifies one differential wire pair. Accordingly, a contactless plug connector 100 suitable for USB connections would include two wires as input/output 140.

The contactless plug connector 100 of the invention is not necessarily a bi-directional data transmission connector. According to another embodiment of the invention, a contactless plug connector includes at least one input, a transmitting circuit and an antenna element, whereas the corresponding mating connector only includes at least one output, a receiving circuit and an antenna element or vice versa. Such a realization of the contactless plug connector according to the invention may be advantageous for time critical transmissions, for highly fail safe appliances, for cost optimization reasons or may be required by the field of application. The contactless plug connector of this embodiment allows for uni-directional data transmissions only.

For the transmission operation, a baseband input signal is input via the input/output 140 to the transmitting and/or receiving circuit 155 of the contactless plug connector 100 of the embodiment shown in FIGS. 1a and 1b. The transmitting and/or receiving circuit 155 modulates the baseband input signal on a predetermined carrier frequency.

Thereafter, the transmitting and/or receiving circuit 155 outputs the modulated input signal to the antenna element 110 or 120 so as to emit the modulated input signal as a radio wave of the predetermined carrier frequency.

Similarly, for the reception operation, the transmitting and/or receiving circuit 155 of contactless plug connector 100 of the embodiment shown in FIGS. 1a and 1b receives via the antenna element 110 or 120 a radio wave of a predetermined carrier frequency. Thereafter, the transmitting and/or receiving circuit 155 demodulates the received radio wave and outputs the demodulated radio wave as a baseband output signal to the input/output 140.

The transmitting/receiving circuit 155 only performs a modulating and/or demodulating operation of a radio wave. Thus, the transmission delay introduced by the contactless plug connector 100 is very low. In particular, the transmitting/receiving circuit 155 does not perform data processing which is inherent to commonly known wireless transmission control protocols, for instance, the Wi-Fi protocol stack.

In other words, the transmitting/receiving circuit 155 directly modulates to the inputted signal without any intermittent processing compliant to a protocol stack (i.e. no OSI 2 or 3 layers). Thereby, delays in the signal path can be avoided and at the same time transparency to the signal is provided. Due to the transparency to the signal, it is possible to transfer a baseband signal in a contactless manner with the contactless plug connector behaving like a "conductive based" connector.

Advantageously, the contactless plug connector 100 may perform, prior to the transmitting/receiving circuit 155 modulating or demodulating the baseband signal, signal conversions on the inputted signal, as for example an scaling of the voltage level or a shift of the voltage range of the baseband signal so as to, for example, comply with signal requirements of the transmitting/receiving circuit 155.

In an exemplary realization of the embodiment shown in FIGS. 1a and 1b, it has proven beneficial for the transmitting/receiving circuit 155 to modulate and/or demodulate an input baseband signal onto/from a carrier frequency of approximately 60 GHz. The 60 GHz ISM band allows for a fast data transmission between the contactless plug connector 100 and a corresponding mating connector and limits the amount of delay introduced in the data transmission to approximately 10 ns. For example, using a carrier frequency of precisely 60.5 GHz maximizes the bandwidth of a single carrier system within the ISM band of 57-64 GHz band. Thereby, the contactless plug connector system complies with the tolerances defined, for instance, in the USB standard. Further, the 60 GHz ISM band provides a large bandwidth that can be utilized for data transmissions. Advantageously, also the size of the antenna element for use with the 60 GHz ISM band reduces since the length of an antenna is adapted to the wavelength.

For a successful signal transmission, the contactless plug connector 100 of the embodiment shown in FIGS. 1a and 1b includes a securing element for securing the mating end of the contactless plug connector at close proximity to a corresponding mating end of the mating connector. In the secured state, an electromagnetic connection can be established and/or maintained with the corresponding mating connector.

In the exemplary embodiment shown in FIGS. 1a and 1b, the contactless plug connector 100 includes a screw thread 135 as securing element, which allows the mating end of the contactless plug connector 100 to be secured by screwing it to the corresponding mating end of the mating connector. The mating end of the contactless plug connector 100 can be secured to the corresponding mating connector with a space between both mating ends, i.e. the mating ends being in close proximity to each other. In other words, the securing element allows for the contactless plug connector being secured to the mating connector without the mating end of the contactless plug connector abutting and/or being in direct physical contact to the corresponding mating end of the mating connector.

Since in the secured state the screw thread 135 maintains the mating end of the contactless plug connector at a predetermined distance to the corresponding mating end of the mating connector, the screw thread 135 allows for a robust electromagnetic connection between the contactless plug connector and the corresponding mating connector without need for a direct physical contact between the mating end of the contactless plug connector and the corresponding mating end of the mating connector.

In an exemplary realization of the embodiment shown in FIGS. 1a and 1b, the screw thread 135 protrudes from the mating end of the contactless plug connector by a distance $d_1$ of approximately 6 mm. Accordingly, the screw thread 135 allows for securing the mating end of the contactless plug connector with the corresponding mating end of the mating connector at a variable spacing, i.e. with a distance tolerance ($d_1$) of up to 6 mm. At the same time, the transmitting/receiving circuit 155 and the at least one antenna element 110 and 120 are also configured to allow for an electromagnetic connection when the contactless plug connector is secured to the corresponding mating connector at distances of up to 6 mm.

Advantageously, the securing element of the contactless plug connector allows for securing the mating end of the contactless plug connector at a variable spacing of up to a predetermined distance to a corresponding mating end of mating connector. The predetermined distance corresponds to approximately the diameter of the mating end's surface of the contactless plug connector. In other words, the securing element secures the mating end of the contactless plug connector to the corresponding mating connector with a distance tolerance ($d_1$) of no more than the diameter of the surface of the mating end of the contactless plug connector. Thereby, an electromagnetic connection can be established and/or maintained even under harsh environmental influences as e.g. dust, dirt, shock and mechanical stress. For example, the contactless plug connector 100 can be secured to the corresponding mating connector even when dirt covers the mating end of the contactless plug connector 100 and still allows for an electromagnetic connection therebetween.

Consequently, due to the distance tolerance of the securing element, the contactless plug connector 100 of this embodiment is, in a secured state, operable with a corresponding mating connector, namely without the need for a direct physical contact between the mating end of the contactless plug connector 100 and the corresponding mating end of the mating connector.

In an exemplary realization of the embodiment shown in FIGS. 1a and 1b, the screw thread 135 is formed of dielectric material such as resin or alternatively realized of conductive and/or magnetic material such as iron or steal. In case the screw thread 135 is realized of conductive and/or magnetic material, the screw thread 135 additionally shields the electromagnetic connection from interference on the outside.

In an alternative exemplary embodiment of the invention, the contactless plug connector includes a magnetic securing element at the mating end which allows securing the mating end of the contactless plug connector by magnetic force at close proximity to the corresponding mating end of the mating connector. Further, in another alternative exemplary embodiment of the invention, a rubber sleeve included in the contactless plug connector allows securing the mating end of the contactless plug connector by elastic deformation at close proximity to the corresponding mating end of the mating connector.

According to yet another alternative embodiment of the invention, the contactless plug connector includes as the securing element a thread on the outside of the contactless plug connector enabling the contactless plug connector to be secured onto a structural element at close proximity to the corresponding mating connector. In this embodiment, the structural element maintains the mating end of the contactless plug connector at close proximity to the corresponding mating end of the mating connector.

In summary, due to the contactless plug connector being secured at close proximity to the corresponding mating connector, electromagnetic radio wave transmitted by the antenna element 110 or 120 of the contactless plug connector 100 can be received by the corresponding mating connector. Similarly, due to the contactless plug connector being secured at close proximity to the corresponding mating connector, electromagnetic radio waves transmitted by the corresponding mating connector can be received by the antenna element 110 or 120 of the contactless plug connector 100. Accordingly, in the secured state, the contactless plug connector 100 is electromagnetically connectable to the corresponding mating connector.

Although the securing element allows for a variable spacing of up to a predetermined distance between the contactless plug connector 100 housing the antenna element 110 or 120 and the corresponding mating connector, a small distance improves signal transmission quality between the contactless plug connector 100 and the corresponding mating connector. In this respect, it is preferable to arrange the antenna element 110 or 120 within the mating end of contactless plug connector 100 as shown in FIG. 1a and 1b.

The contactless plug connector 100 of the embodiment shown in FIGS. 1a and 1b is not limited to electromagnetic connectivity only. The contactless plug connector 100 of the embodiment shown in FIGS. 1a and 1b also allows for transmission of power between contactless plug connector 100 and the corresponding mating connector. Accordingly, the contactless plug connector 100 of the embodiment shown in FIGS. 1a and 1b may realize a full-featured data and power connection and is compatible with known transmission standards, for instance, Ethernet, USB, CAN IO-link and RS485.

For this purpose, the contactless plug connector 100 of FIGS. 1a and 1b includes an inductive coupling element comprising a coil 125 and optionally a ferrite element 130. The indicative coupling element is connected via the transmitting/receiving circuit 155 to the input/output 140. Accordingly, electric power provided via the input/output 140 to the contactless plug connector 100 can be transmitted by the inductive coupling element to the corresponding mating connector. Alternatively or additionally, power received by the inductive coupling element of the contactless plug connector from a corresponding mating connector can be provided to the input/output 140.

Further, the connection of the transmitting/receiving circuit 155 to the inductive coupling element and the input/output 140 allows the transmitting/receiving circuit 155 to at least partially use the transmitted power for modulating and transmitting and/or receiving and demodulating radio waves via the antenna element 110 or 120.

In more detail, the inductive coupling element is arranged within the mating end of the contactless plug connector 100 such that, in the secured state, the inductive coupling element of the contactless plug connector 100 forms an induction loop with a corresponding inductive coupling element within the mating end of the mating connector. In particular, due to mating end of the contactless plug connector being secured at close proximity to the corresponding mating end of the mating connector, a magnetic circuit (i.e. induction loop) is provided in the secured state between the contactless plug connector and the mating connector enabling power transmission with low transfer losses.

As shown in FIGS. 1a and 1b, the coil 125 of the inductive coupling element of the contactless plug connector 100 is configured with a predetermined diameter. The diameter of the coil 125 of the contactless plug connector is predetermined so as to allow, in the secured state, for power transmission with low transfer losses to a mating connector. In particular, for reducing the transfer losses of power transmitted between the contactless plug connector and the corresponding mating connector, the securing element 135 is adapted to limit the distance between the surface of the mating end of the contactless plug connector and the corresponding mating connector to not more than the diameter $d_3$ of the coil 125. In other words, depending on the dimension (i.e. diameter $d_3$) of the coil 125 in the mating end of the contactless plug connector 100 is the securing element 135 adapted to allow for a wider or narrower gap between the surface of the mating end of the contactless plug connector 100 and the corresponding mating connector. In other words, the diameter $d_3$ of the coil 125 of the contactless plug connector is configured to reduce transfer losses even when the mating end of the contactless plug connector is, in the secured state, not in direct physical contact to the corresponding mating end of the mating connector. As can be seen from FIG. 1a, the diameter of the surface of the mating end of the contactless plug connector 100 approximates the diameter $d_3$ of the coil 125.

Specifically, the diameter of the coil 125 of the inductive coupling element of the contactless plug connector 100 determines the directivity of the magnetic field of the coupling element. A magnetic field with a high directivity (i.e. small lateral spread) may be advantageous in realization of contactless plug connectors where the securing element of the contactless plug connector prevents, in the secured state, from lateral misalignment between the mating end of the contactless plug connector and the corresponding mating end of mating connector. Alternatively, a magnetic field with a low directivity (i.e. high lateral spread) may be advantageous in realization of contactless plug connectors where the securing element of the contactless plug connector allows in the secured state for lateral misalignment between the mating end of the contactless plug connector and the corresponding mating end of mating connector.

As shown in FIGS. 1a and 1b, the inductive coupling element of the contactless plug connector comprises a ferrite element 130 which is however optional to the transmission of power. The ferrite element 130 has a u-shaped cross-section and is arranged within the mating end of the contactless plug connector surrounding the coil 125 of the contactless plug connector from one side so as to focus, in the secured state, the magnetic field of the coil 125 towards the direction of the corresponding mating end of the mating connector. By surrounding the coil 125 of the contactless plug connector, the ferrite element enhances the transmission/reception of power to/from a corresponding mating connector.

For the exemplary realization of the embodiment shown in FIGS. 1a and 1b, namely in case the screw thread 135 allows for securing the mating end of the contactless plug connector with the corresponding mating end of the mating connector with a distance tolerance ($d_1$) of up to 6 mm the diameter of the coil 125 and the ferrite element 130 of the contactless plug connector are adapted to allow transmission/reception of power to/from the mating connector at distances of up to 6 mm.

In a more detailed exemplary realization of the embodiment, the securing element is adapted to secure the mating end of the contactless plug connector to the corresponding mating connector with a lateral misalignment tolerance of no more than 25% of the coil diameter. At the same time, the transmitting/receiving circuit 155 and the at least one antenna element 110 and 120 is also configured to allow for an electromagnetic connection when the contactless plug connector is secured to the corresponding mating connector with a lateral misalignment of no more than 25% of the coil diameter.

In this exemplary realization of the embodiment shown in FIGS. 1a and 1b, the diameter of the coil 125 and the ferrite element 130 of the contactless plug connector are also adapted to allow transmission/reception of power to/from the mating connector when the contactless plug connector is secured to the corresponding mating connector with a lateral misalignment of no more 25% of the coil diameter.

In another more detailed exemplary realization of the embodiment, the securing element is adapted to secure the mating end of the contactless plug connector to the corresponding mating connector with a tilt misalignment tolerance of no more than 15° angle with respect to the longitudinal axis. At the same time, the transmitting/receiving circuit 155 and the at least one antenna element 110 and 120 is also configured to allow for an electromagnetic connection when the contactless plug connector is secured to the corresponding mating connector with a tilt misalignment of no more than 15° angle with respect to the longitudinal axis. Furthermore, the diameter of the coil 125 and the ferrite element 130 of the contactless plug connector is adapted to allow transmission/reception of power to/from the mating connector when the contactless plug connector is secured to the corresponding mating connector.

The contactless plug connector 100 may additionally include an intermediate voltage regulator connected between the input/output 140 and to the inductive coupling element. The intermediate voltage regulator may convert the voltage level of the input/output 140 to a predefined voltage level advantageous for transmission via the inductive coupling element. Additionally or alternatively, the intermediate voltage regulator may include a DC/AC converter for converting a DC input voltage from the input/output 140 to an AC output voltage so as to allow transmission via the inductive coupling element. The intermediate voltage regulator may be included in the transmitting/receiving circuit 155.

In another embodiment according to the invention, the contactless plug connector 100 may allow the transmission of power in both directions. For this purpose, the contactless plug connector 100 and the corresponding mating connector, each includes a detector for detecting whether power is received via the input/output 140 or via the inductive coupling element.

According to another, more detailed embodiment the invention, the contactless plug connector is configured so that a reception of a predetermined amount of power triggers the transmission of predefined information, for instance status information or initialization information. In more detail, upon the contactless plug connector 100 detecting the reception via the inductive coupling element of a predetermined amount of power and supplies received power to the transmitting/receiving circuit 155, which thereupon initiates the transmission via antenna element 110 or 120 of predefined information to the corresponding mating connector or vice versa. Thereby, the secured state is detectable by the corresponding mating connector and/or by the contactless plug connector 100. Preferably, the transmission of predefined information is short in time to allow a fast activation of the connection.

According to the embodiment shown in FIGS. 1a and 1b, the contactless plug connector 100 is provided as a radial connector. For this purpose, the mating end of the contactless plug connector 100 is provided with a round cross-section as show in FIG. 1 b. Further, the securing element is adapted to allow the contactless plug connector to be secured in a rotated state to the corresponding mating connector.

In order to allow the contactless plug connector 100 to transmit and/or receive radio waves to/from the corresponding mating connector when secured in an arbitrary rotated state, the at least one antenna element 110 or 120 is adapted to transmit and/or to receive radio waves with a circular polarization.

Further, to allow the contactless plug connector 100 to transmit and/or receive power to/from the corresponding mating connector when secured in a rotated state, the coil 125 and the optional ferrite element 130 are arranged circularly so as provide one magnetic polarity (e.g. north pole) at the center of the mating end of the contactless perimeter of the mating end of the contactless plug connector 100.

According to an example, one antenna element 110 or 120 of the contactless plug connector 100 may transmit/receive left handed circular polarized radio waves, and another antenna element 120 or 110 of the contactless plug connector 100 may respectively receive/transmit right handed circular polarized radio waves. More detailed examples regarding the at least one antenna element 110 or 120 will be given with respect to the detailed embodiments corresponding to FIGS. 2 to 5.

There are different possibilities for implementing the antenna element(s) 110 and/or 120 and transmitting/receiving circuit 155. First of all, as shown in FIGS. 1a and 1b, the antenna element(s) 110 and/or 120 may be electrically connected to the feed of the transmitting/receiving circuit 155. Alternatively, the antenna element(s) 110 and/or 120 and the transmitting/receiving circuit 155 may be realized in a module. According to another alternative, the antenna element(s) 110 and/or 120 for transmitting and/or receiving a circular polarized electromagnetic radio wave may be connected via a non-polarized or linearly-polarized electromagnetic connection to the transmitting/receiving circuit 155. In this alternative realization, the antenna element 110 and/or 120 may be understood as an element capturing and converting the non-polarized or linearly-polarized radio wave from the transmitting and/or receiving circuit 155 into a circular polarized wave and vice versa.

Figure 2A:
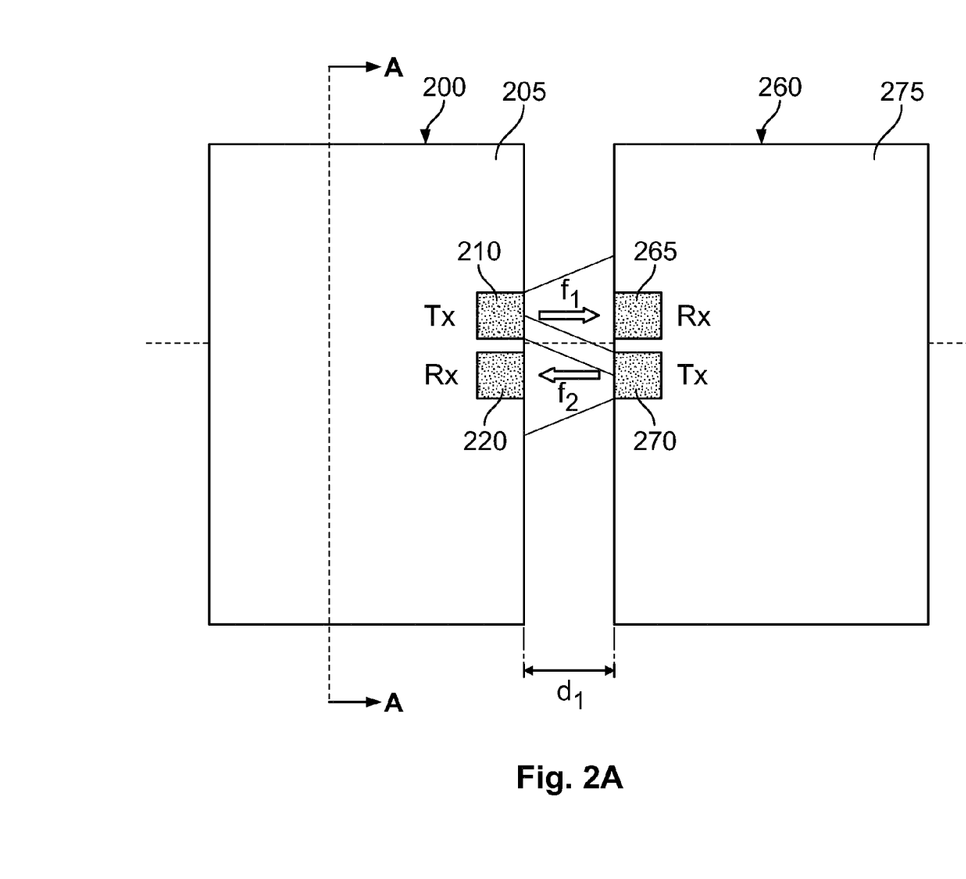
FIGS. 2a and 2b schematically shows a printed circuit board of a contactless plug connector with a corresponding printed circuit board of a mating connector in a secured state and a cross-section of the a printed circuit board of a contactless plug connector along the line A-A according to one exemplary embodiment of the invention, FIGS. 3a and 3b schematically shows a printed circuit board of a contactless plug connector with a corresponding printed circuit board of a mating connector in a secured state and a cross-section of the a printed circuit board of a contactless plug connector along the line A-A according to another exemplary embodiment of the invention, FIGS. 4a and 4b schematically shows a printed circuit board of a contactless plug connector with a corresponding printed circuit board of a mating connector in a secured state and a cross-section of the a printed circuit board of a contactless plug connector along the line A-A according to a further exemplary embodiment of the invention, and FIGS. 4c and 4d schematically shows a printed circuit board of a contactless plug connector with another corresponding printed circuit board of a mating connector in a secured state and a cross-section of the a printed circuit board of a contactless plug connector along the line A'-A' according to the exemplary embodiment of FIGS. 4a and 4b of the invention, and FIGS. 5a and 5b schematically shows a printed circuit board of a contactless plug connector with a corresponding printed circuit board of a mating connector in a secured state and a cross-section of the a printed circuit board of a contactless plug connector along the line A-A according to another exemplary embodiment of the invention.
Figure 2B:
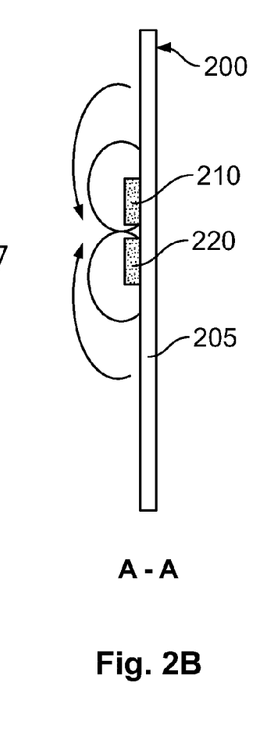

Referring now to FIGS. 2a and 2b, a contactless plug connector 200 according to an exemplary embodiment of the invention is shown with a corresponding mating connector 260 in secured state.

FIG. 2a is a sectional view of a contactless plug connector 200 of the exemplary embodiment of the invention together with a mating connector 260. Further, FIG. 2b illustrates a cross-section of the contactless plug connector of FIG. 2a along the line A-A.

The contactless plug connector of FIGS. 2a and 2b is based on the contactless plug connector of FIGS. 1a and 1b where corresponding parts are given corresponding reference numerals and terms. The detailed description of corresponding parts has been omitted for reasons of conciseness.

The contactless plug connector 200 of the detailed embodiment shown in FIGS. 2a and 2b includes a first antenna element 210 and a second antenna element 220. Further, the contactless plug connector 200 includes a printed circuit board 205 on which the first antenna element 210 and the second antenna element 220 are mounted. The printed circuit board 205 is arranged within the contactless plug connector 200 at close proximity to the mating end thereof.

In detail, the first antenna element 210 of this embodiment is adapted to transmit radio waves with a first predetermined carrier frequency ($f_1$) and the second antenna element 220 of this embodiment is adapted to receive radio waves modulated with a second predetermined carrier frequency ($f_2$).

Further, the contactless plug connector 200 includes a transmitting/receiving circuit connected to the first and second antenna element 210 and 220 and an input/output for input of a baseband input signal and for output of a baseband output signal, which are, however, not shown in FIGS. 2a and 2b.

Similar to the contactless plug connector 100 of FIGS. 1a and 1b, the contactless plug connector 200 additionally includes a securing element for securing the mating end of the contactless plug connector 200 at close proximity to the corresponding mating end of the mating connector 260 such that an electromagnetic connection can be established with the corresponding mating connector 260. In more detail, the securing element is adapted to secure the mating end of the contactless plug connector 200 to the corresponding mating connector with a distance tolerance ($d_1$). The securing element has been omitted in FIGS. 2a and 2b for ease of illustration of the contactless plug connector 200.

The contactless plug connector 200 may additionally include the inductive coupling element for transmission/reception of power to/from the corresponding mating connector 260 as described with reference to the embodiment of FIGS. 1a and 1b. For conciseness reasons, the description of the inductive coupling element has been omitted in this embodiment.

For the transmission operation, a baseband input signal is input via the input/output to the transmitting/receiving circuit of the contactless plug connector 200. The transmitting and/or receiving circuit modulates the baseband input signal on a first predetermined carrier frequency ($f_1$). Thereafter, the transmitting/receiving circuit outputs the modulated input signal to the first antenna element 210 so as to emit the modulated input signal as a radio wave of the first predetermined carrier frequency ($f_1$).

Similarly, for the reception operation, the transmitting and/or receiving circuit of contactless plug connector 200 receives via the second antenna element 120 a radio wave of a second predetermined carrier frequency ($f_2$). Thereafter, the transmitting and/or receiving circuit demodulates the received radio wave and outputs the demodulated radio wave as a baseband output signal to the input/output.

Accordingly, the transmitting/receiving circuit is adapted to modulate an inputted baseband input signal onto the first predetermined carrier frequency ($f_1$) and transmit the modulated baseband input signal via the first antenna element 210; and to demodulate a radio wave with the second predetermined carrier frequency ($f_2$), received via the second antenna element 220, into a baseband output signal.

Advantageously, the contactless plug connector utilizing the first predetermined carrier frequency ($f_1$) for the transmission operation and utilizing the second predetermined carrier frequency ($f_2$) (being different from the first predetermined carrier frequency $f_1$) for the reception operation allows for simultaneous transmission operation via the two antenna elements without interference therebetween.

The first and the second predetermined carrier frequency may be preconfigured for the contactless plug connector 200 or may be configured by a user via an input, e.g. a switch or a software interface included in the input/output. Alternatively, the first and the second predetermined carrier frequency may be configured during initialization by the contactless plug connector transmitting predefined information, for instance status information or initialization information, modulate with a predetermined carrier frequency common to the contactless plug connector 200 and the corresponding mating plug connector.

In a more detailed embodiment, the first and second predetermined carrier frequency may be configured depending on whether the contactless plug connector 200, including the inductive coupling element as described in the embodiment of FIGS. 1a and 1b, is configured to transmit or receive power to/from the corresponding mating connector 260 in the secured state.

In another detailed embodiment, the contactless plug connector 200 is adapted to allow transmission of power in both directions by including the inductive coupling element and the detector as described in the embodiment of FIGS. 1a and 1b. Then, the first and second predetermined carrier frequency may be configured depending on whether the detector of the contactless plug connector 200 detects that power is received via the input/output or via the inductive coupling element.

Similar to the embodiment shown in FIGS. 1a and 1b, the securing element of the contactless plug connector 200 may be adapted to allow the contactless plug connector 200 to be secured in a rotated state to the corresponding mating connector 260.

In order to allow the contactless plug connector 100 to transmit and/or receive radio waves to/from the corresponding mating connector when secured in an arbitrary rotated state, the first and second antenna element 210 and 220 is adapted to transmit and/or to receive radio waves with a circular polarization. According to an exemplary realization shown in FIG. 2b, the first antenna element 210 is adapted to transmit and/or receive right-handed circular polarized radio waves and the second antenna element 220 is adapted to receive and/or transmit left-handed circular polarized radio waves. Notwithstanding a particular type of circular polarization, an antenna element 210 or 220 of the contactless plug connector 200 is configured to transmit and/or receive via a type of circular polarization which is same to the type of circular polarization of the corresponding antenna element 265 or 270 of the mating plug connector 275 for establishing an electromagnetic connection.

Further, to allow the contactless plug connector 200 to transmit and/or receive power to/from the corresponding mating connector when secured in an arbitrary rotated state, the optional inductive coupling element may require a particular configuration as described in the embodiment of FIGS. 1a and 1b.

Figure 3A:
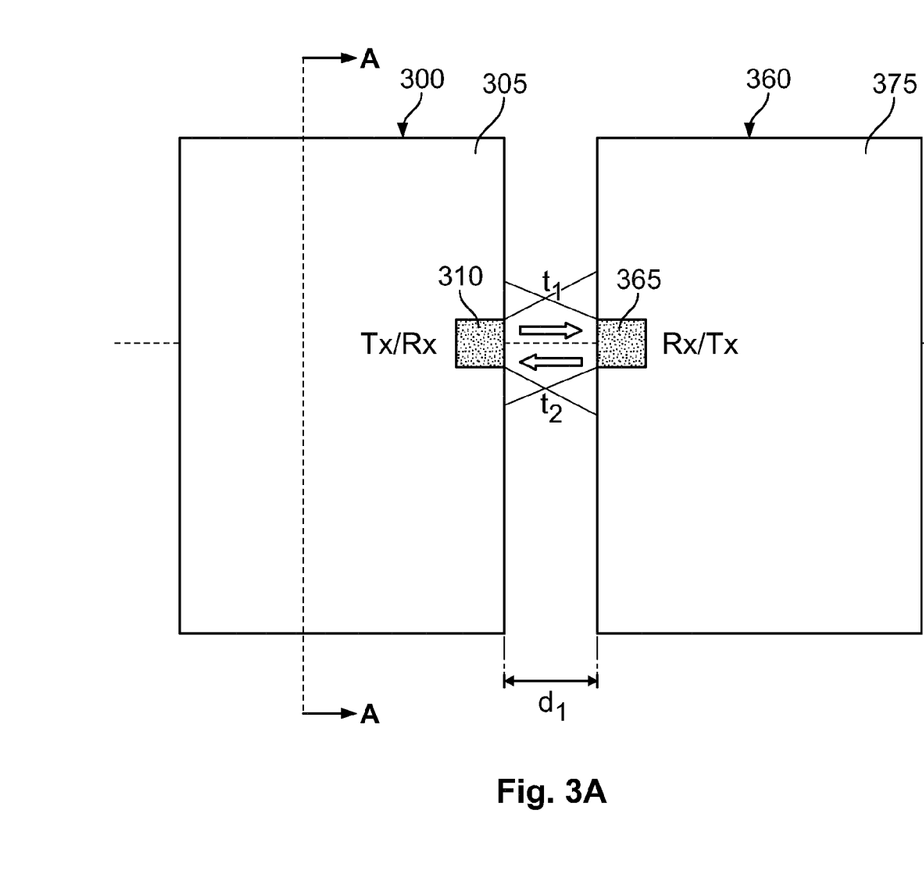
Figure 3B:
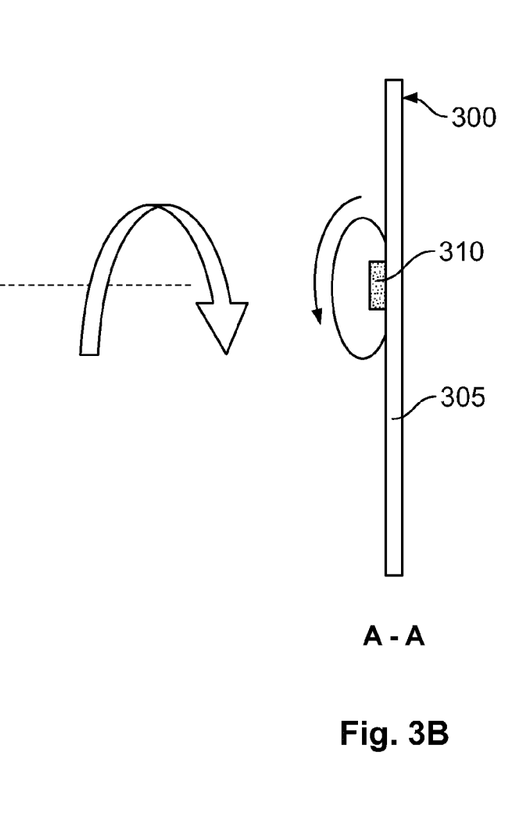

Referring now to FIGS. 3a and 3b, a contactless plug connector 300 according to another exemplary embodiment of the invention is shown with a corresponding mating connector 360 in a secured state.

FIG. 3a is a sectional view of a contactless plug connector 300 of the exemplary embodiment of the invention together with a mating connector 360. Further, FIG. 3b illustrates a cross-section of the contactless plug connector of FIG. 2a along the line A-A.

The contactless plug connector of FIGS. 3a and 3b is based on the contactless plug connector of FIGS. 1a and 1b where corresponding parts are given corresponding reference numerals and terms. The detailed description of corresponding parts has been omitted for reasons of conciseness.

The contactless plug connector 300 of the detailed embodiment shown in FIGS. 3a and 3b includes a single antenna element 310. Further, the contactless plug connector 300 includes a printed circuit board 305 on which the antenna element 310 is mounted. The printed circuit board 305 is arranged within the contactless plug connector 300 at close proximity to the mating end thereof.

Additionally, the contactless plug connector 200 includes a transmitting/receiving circuit connected to the antenna element 310 and an input/output for input of a baseband input signal and for output of a baseband output signal, which are, however, not shown in FIGS. 3a and 3b.

The contactless plug connector 300 of this embodiment is adapted to alternatively transmit and receive radio waves with a predetermined carrier frequency. For this purpose, the transmitting/receiving circuit is adapted to alternatively (i) modulate and transmit an inputted baseband input signal to the antenna element 310, or (ii) receive and demodulate from the antenna element 310 a radio wave with the predetermined carrier frequency.

In particular, in a first time period i.e. as step (i) the transmitting/receiving circuit modulates an inputted baseband input signal received via input/output onto the predetermined carrier frequency and transmits the modulated baseband input signal via one of the at least one antenna element. In a second time period, i.e. as step (ii), the transmitting/receiving circuit demodulates a radio wave, received via the antenna element 310, into a baseband output signal and outputs the baseband output signal to the input/output.

Specifically, the contactless plug connector 300 may be configured with a pre-defined time schedule according to which the transmitting/receiving circuit alternatively performs (i) the modulation and transmission operation, or (ii) the reception and demodulation operation. Hence, the transmitting/receiving circuit switches between the transmission and the reception operation via the same antenna element avoiding interference between the two operations.

The first and the second time period of the time schedule may be pre-configured or may be configured by a user via an input relative to a time signal, e.g. a switch or a software interface included in the input/output. The time signal defines the rate at which the step (i) is repeated. Alternatively, the first and the second time period of the time schedule may be configured during initialization by the contactless plug connector transmitting predefined information, for instance status information or initialization information, modulate with a predetermined carrier frequency common to the contactless plug connector 300 and the corresponding mating plug connector 360.

In particular, for a successful transmission/reception operation according to this embodiment, the contactless plug connector 300 and the corresponding mating connector 360 have to be time synchronized. In particular, time synchronized refers to a state in which simultaneous transmission operations by the contactless plug connector 300 and by the corresponding mating connector 360 are avoided. Time synchronized does not necessarily require a same time signal for the contactless plug connector 300 and for the corresponding mating connector 360. Moreover, the time signal may also be defined in relation to a transmission operation, i.e. that contactless plug connector 300 realigns its reception operation corresponding to a start of transmission by the corresponding mating connector 360. This however requires that contactless plug connector 300 and the corresponding mating connector 360 are configured with the same first and second time period.

In a more detailed embodiment, the first and second time period may be configured depending on whether the contactless plug connector 300, including the inductive coupling element as described in the embodiment of FIGS. 1a and 1b, is configured to transmit or receive power to/from the corresponding mating connector 360 in the secured state.

In another detailed embodiment, the contactless plug connector 300 is adapted to allow transmission of power in both directions by including the inductive coupling element and the detector as described in the embodiment of FIGS. 1a and 1b. Then, the first and second time period may be configured depending on whether the detector of the contactless plug connector 300 detects that power is received via the input/output or via the inductive coupling element.

Similar to the contactless plug connector 100 of FIGS. 1a and 1b, the contactless plug connector 300 additionally includes a securing element for securing the mating end of the contactless plug connector 300 at close proximity to the corresponding mating end of the mating connector 360 such that an electromagnetic connection can be established with the corresponding mating connector 360. In more detail, the securing element is adapted to secure the mating end of the contactless plug connector 300 to the corresponding mating connector with a distance tolerance ($d_1$). The securing element has been omitted in FIGS. 3a and 3b for ease of illustration of the contactless plug connector 300.

The contactless plug connector 300 may additionally include the inductive coupling element for transmission/reception of power to/from the corresponding mating connector 360 as described with reference to the embodiment of FIGS. 1a and 1b. For conciseness reasons, the description of the inductive coupling element has been omitted in this embodiment.

Similar to the embodiment shown in FIGS. 1a and 1b, the securing element of the contactless plug connector 300 may be adapted to allow the contactless plug connector 300 to be secured in a rotated state to the corresponding mating connector 360.

In order to allow the contactless plug connector 300 to transmit and/or receive radio waves to/from the corresponding mating connector when secured in an arbitrary rotated state, the antenna element 310 is adapted to transmit and/or to receive radio waves with a circular polarization. According to an exemplary realization shown in FIG. 3b, the antenna element 310 is adapted to transmit right handed circular polarized radio waves and adapted to receive right handed circular polarized radio waves or vice versa.

Further, to allow the contactless plug connector 300 to transmit and/or receive power to/from the corresponding mating connector when secured in an arbitrary rotated state, the optional inductive coupling element may require a particular configuration as described in the embodiment of FIGS. 1a and 1b.

Referring now to FIGS. 4a, 4b, 4c and 4d, a contactless plug connector 400 according to another exemplary embodiment of the invention is shown with a corresponding mating connector 460 in secured state.

Figure 4A:
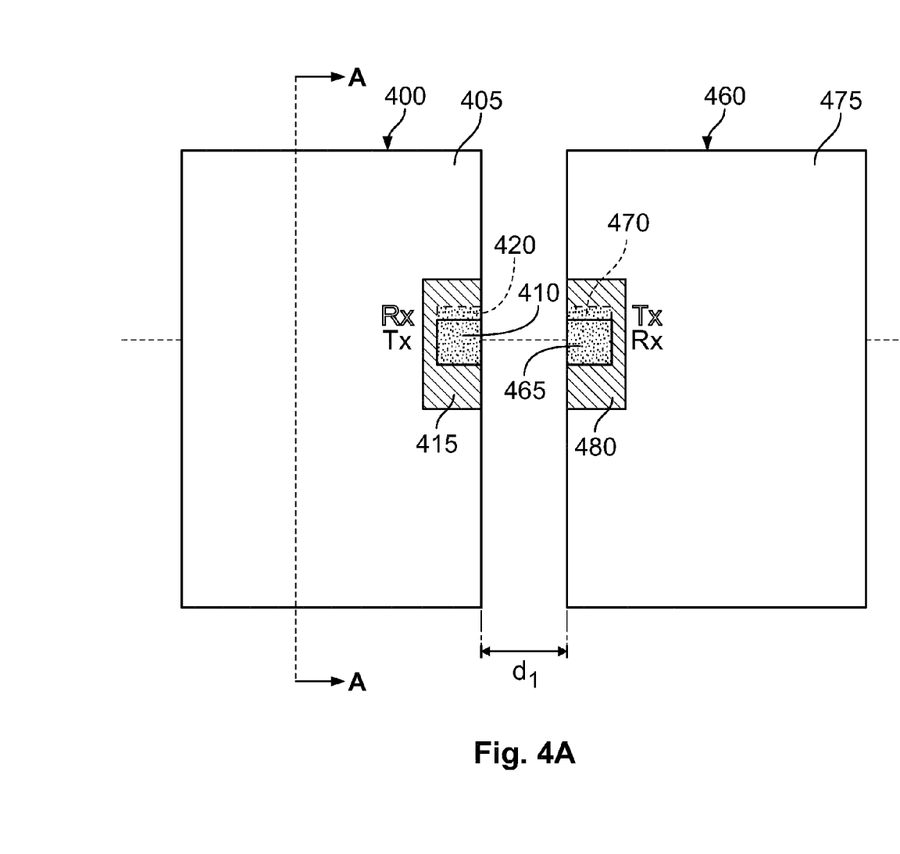
Figure 4B:
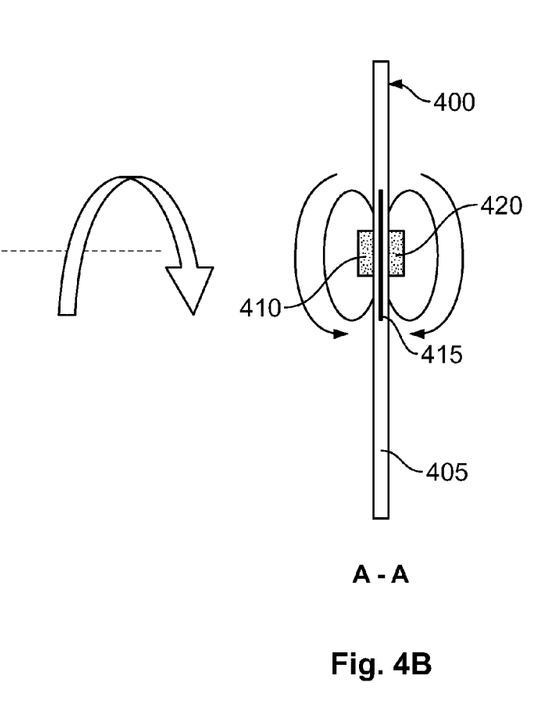
Figure 4C:
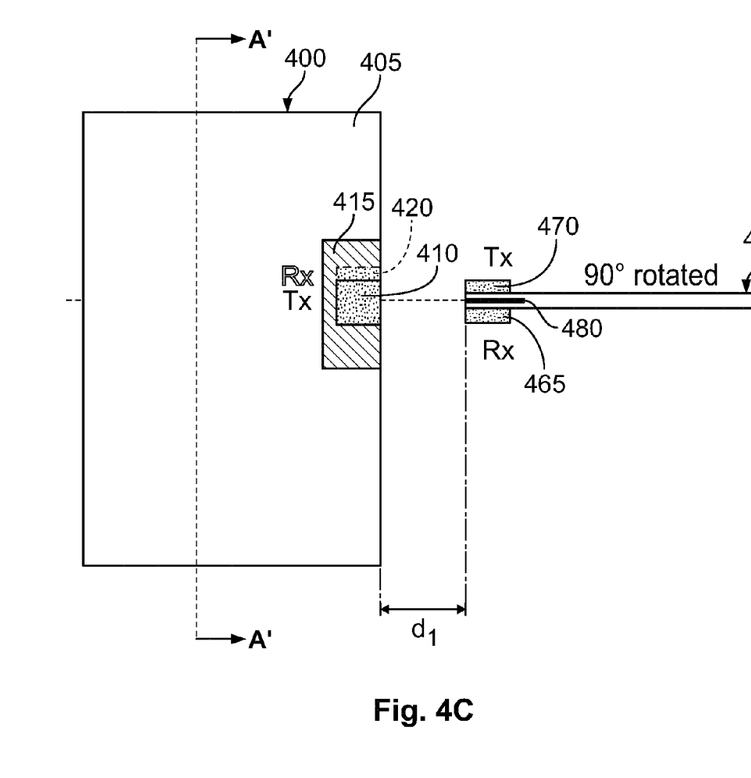

FIG. 4a is a sectional view of a contactless plug connector 400 of the exemplary embodiment of the invention together with a mating connector. Further, FIG. 4b illustrates a cross-section of the contactless plug connector of FIG. 4a along the line A-A. FIG. 4c is a sectional view of the contactless plug connector 400 of the exemplary embodiment of the invention together with a differently rotated mating connector.

Further, FIG. 4b illustrates a cross-section of the contactless plug connector of FIG. 4a along the line A-A.

The contactless plug connector 400 of FIGS. 4a, 4b, 4c and 4d is based on the contactless plug connector of FIGS. 1a and 1b where corresponding parts are given corresponding reference numerals and terms. The detailed description of corresponding parts has been omitted for reasons of conciseness.

The contactless plug connector 400 of the detailed embodiment shown in FIGS. 4a, 4b, 4c and 4d includes a first antenna element 410 and a second antenna element 420. Further, the contactless plug connector 400 includes a printed circuit board 405 on which the first antenna element 410 and the second antenna element 420 are mounted. The printed circuit board 405 is arranged within the contactless plug connector 400 at close proximity to the mating end thereof.

Figure 4D:
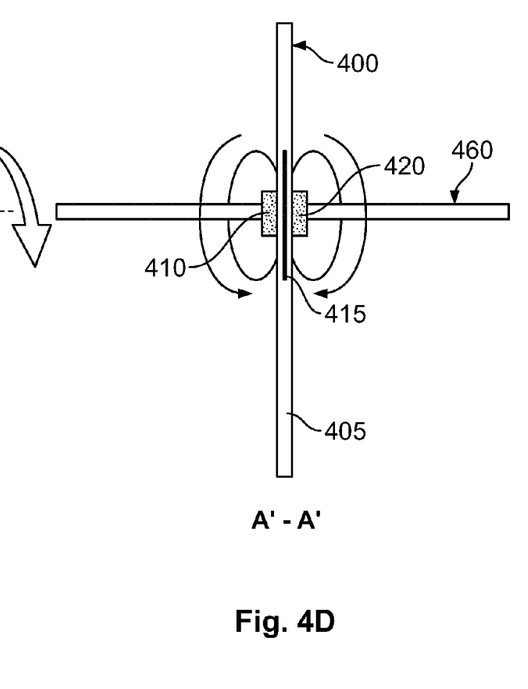

In particular, the printed circuit board 405 of the contactless plug connector 400 is illustrated in FIGS. 4a and 4b in alignment to a printed circuit board 475 of the corresponding mating connector 460 i.e. the printed circuit board 405 and the printed circuit board 475 lie in a same plane. In FIGS. 4c and 4d, the printed circuit board 405 of the contactless plug connector 400 is illustrated in orthogonal alignment to a printed circuit board 475 of the corresponding mating connector 460 i.e. the intersection of the plane defined by the printed circuit board 405 and the plane defined by the printed circuit board 475 is orthogonal.

In this embodiment, the first and second antenna element 410 and 420 are mounted on opposite sides of the printed circuit board 405 within the mating end of the contactless plug connector 400. In order to allow mounting of the first and the second antenna element 410 and 420 on opposite sides of the printed circuit board 405 (i.e. to provide sufficient space for each of the two antenna elements), it is not possible to arrange the printed circuit board 420 directly contacting the outer shielding element (i.e. element 145 in FIGS. 1a and 1b) and or sealing element (i.e. element 150 in FIGS. 1a and 1b) of the contactless plug connector 400.

In other words, the printed circuit board 405 is arranged longitudinally within the contactless plug connector 400 so as to subdivide a cross section of the mating end of the contactless plug connector 400 into two segments. For example, in case of a round cross section of the mating end of the contactless plug connector 400, the printed circuit board 405 may subdivides the cross section into two semi-circles, each semi-circle corresponding to a segment.

With this definition of segments of the cross section of the mating end of the contactless plug connector 400, one of the two segments includes the first antenna element 410 and the other of the two segments includes the second antenna element 420. The first antenna element 410 of this embodiment is adapted to transmit radio waves with a first predetermined carrier frequency and the second antenna element 420 of this embodiment is adapted to receive radio waves modulated with the first predetermined carrier frequency.

Further, the contactless plug connector 400 includes a transmitting/receiving circuit connected to the first and second antenna element 410 and 420 and an input/output for input of a baseband input signal and for output of a baseband output signal, which are, however, not shown in FIGS. 4a, 4b, 4c and 4d.

For the transmission operation, a baseband input signal is input via the input/output to the transmitting/receiving circuit of the contactless plug connector 400. The transmitting and/or receiving circuit modulates the baseband input signal on a first predetermined carrier frequency. Thereafter, the transmitting/receiving circuit outputs the modulated input signal to the first antenna element 410 so as to emit the modulated input signal as a radio wave of the first predetermined carrier frequency.

Similarly, for the reception operation, the transmitting and/or receiving circuit of contactless plug connector 400 receives via the second antenna element 420 a radio wave of the first predetermined carrier frequency. Thereafter, the transmitting and/or receiving circuit demodulates the received radio wave and outputs the demodulated radio wave as a baseband output signal to the input/output.

Similar to the contactless plug connector 100 of FIGS. 1a and 1b, the contactless plug connector 400 additionally includes a securing element for securing the mating end of the contactless plug connector 400 at close proximity to the corresponding mating end of the mating connector 460 such that an electromagnetic connection can be established with the corresponding mating connector 460. In more detail, the securing element is adapted to secure the mating end of the contactless plug connector 400 to the corresponding mating connector with a distance tolerance ($d_1$). The securing element has been omitted in FIGS. 4a, 4b, 4c and 4d for ease of illustration of the contactless plug connector 400.

The contactless plug connector 400 may additionally include the inductive coupling element for transmission/reception of power to/from the corresponding mating connector 460 as described with reference to the embodiment of FIGS. 1a and 1b. For conciseness reasons, the description of the inductive coupling element has been omitted in this embodiment.

As shown in FIGS. 4a, 4b, 4c and 4d, the printed circuit board 405 includes a layer realizing a ground plane 415 in an area of the printed circuit board 405 where the first and the second antenna element 410 and 420 are mounted on opposite sides. In other words, an internal layer of the printed circuit board 405 provides a continuous ground plane 415 in the region where the first and the second antenna element 410 and 420 are mounted on the printed circuit board 405 of the contactless plug connector 400. The ground plane 415 is conductive.

The ground plane 415 of the printed circuit board 405 shields the first antenna element 410 from the second antenna element 420 and vice versa. In particular, during the transmission operation the first antenna element emits radio waves of the first predetermined carrier frequency. The radio waves are emitted by the first antenna element 410 mainly in the direction of the mating end of the contactless plug connector 400. However, the first antenna element 410 may also emit a fraction of the radio waves in the direction of the second antenna element 420.

There may be multiple reasons for radio waves emitted by the first antenna element 410 in the direction of the second antenna element 420. First, the implementation of the first antenna element 410 may only allow for a certain degree of directivity so that radio waves are also emitted in every other direction i.e. also in the direction of the second antenna element 420. Second, the arrangement of elements in the surrounding of the first antenna element 410 within the mating end of the contactless plug connector 400 may reflect at least a fraction of the emitted radio waves in the direction of the second antenna element 420.

Especially due to the short distance between the first and the second antenna element 410 and 420 (at least the thickness of printed circuit board 405), the reception sensitivity of the second antenna element 420 worsens.

In this respect, the ground plane 415 in the printed circuit board 405 shielding the first antenna element 410 from the second antenna element 420 reduces interference between the first and the second antenna element 410 and 420 and vice versa.

In another detailed embodiment, the contactless plug connector 400 is adapted to allow transmission of power in both directions by including the inductive coupling element and the detector as described in the embodiment of FIGS. 1a and 1b. Then, the first and second predetermined carrier frequency may be configured depending on whether the detector of the contactless plug connector 400 detects that power is received via the input/output or via the inductive coupling element.

Similar to the embodiment shown in FIGS. 1a and 1b, the securing element of the contactless plug connector 400 may be adapted to allow the contactless plug connector 400 to be secured in a rotated state to the corresponding mating connector 460.

In order to allow the contactless plug connector 100 to transmit and/or receive radio waves to/from the corresponding mating connector when secured in an arbitrary rotated state, the first and second antenna element 410 and 420 is adapted to transmit and/or to receive radio waves with a circular polarization. According to an exemplary realization shown in FIGS. 4b and 4d, the first antenna element 410 is adapted to transmit and/or receive right-handed circular polarized radio waves and the second antenna element 420 is adapted to receive and/or transmit left-handed circular polarized radio waves. Notwithstanding a particular type of circular polarization, an antenna element 410 or 420 of the contactless plug connector 400 is configured to transmit and/or receive via a type of circular polarization which is same to the type of circular polarization of the corresponding antenna element 465 or 470 of the mating plug connector 475 for establishing an electromagnetic connection.

Further, to allow the contactless plug connector 400 to transmit and/or receive power to/from the corresponding mating connector 460 when secured in an arbitrary rotated state, the optional inductive coupling element may require a particular configuration as described in the embodiment of FIGS. 1a and 1b.

Figure 5A:
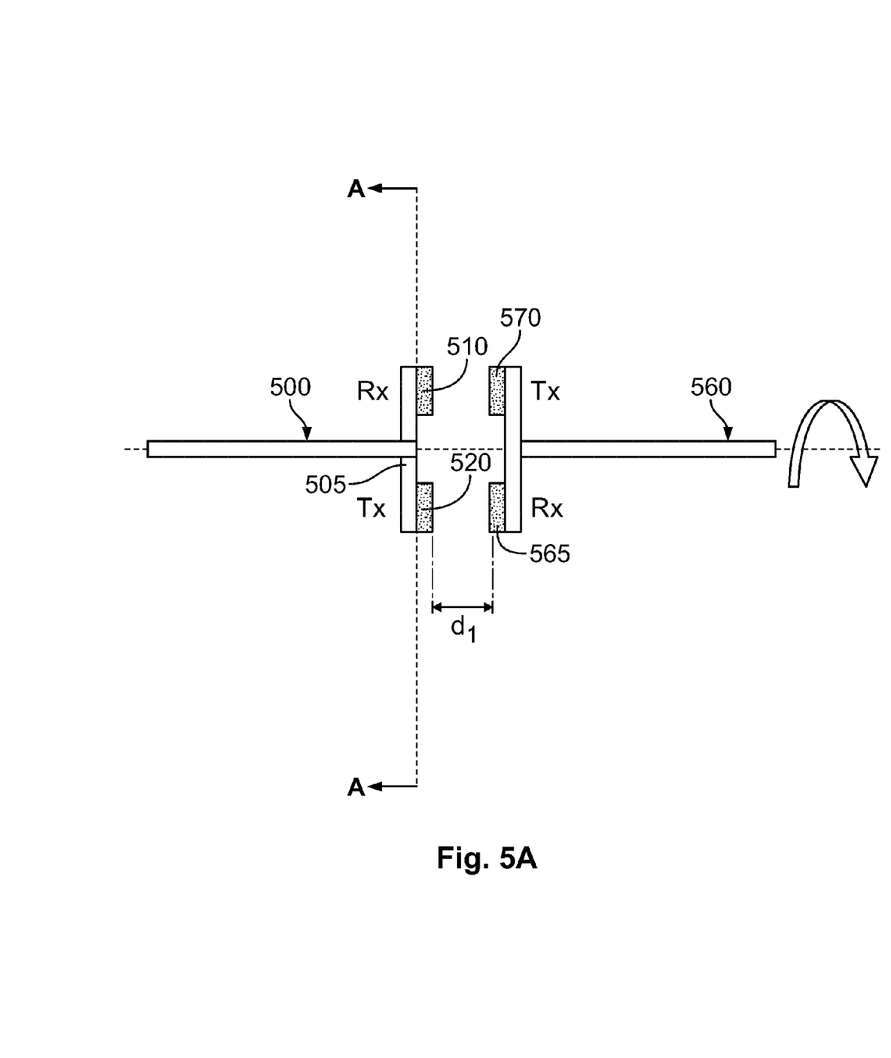
Figure 5B:
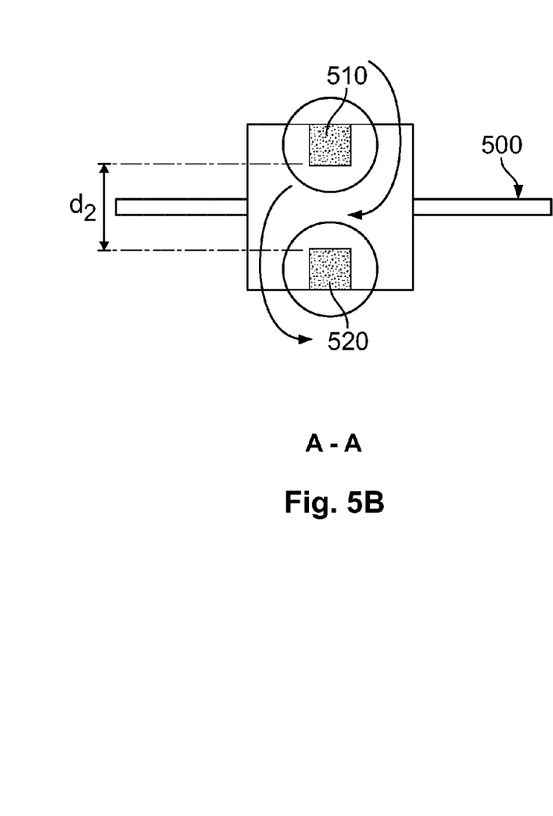

Referring now to FIGS. 5a and 5b, a contactless plug connector 500 according to an exemplary embodiment of the invention is shown with a corresponding mating connector 560 in secured state.

FIG. 5a is a sectional view of a contactless plug connector 500 of the exemplary embodiment of the invention together with a mating connector 560. Further, FIG. 5b illustrates a cross-section of the contactless plug connector of FIG. 5a along the line A-A.

The contactless plug connector of FIGS. 5a and 5b is based on the contactless plug connector of FIGS. 1a and 1b where corresponding parts are given corresponding reference numerals and terms. The detailed description of corresponding parts has been omitted for reasons of conciseness.

The contactless plug connector 500 of the detailed embodiment shown in FIGS. 5a and 5b includes a first antenna element 510 and a second antenna element 520. Further, the contactless plug connector 500 includes a printed circuit board 505 on which the first antenna element 510 and the second antenna element 520 are mounted. The printed circuit board 505 is arranged within the contactless plug connector 500 at close proximity to the mating end thereof.

In this embodiment, the printed circuit board 505 is arranged within the contactless plug connector 500 such that the plane defined by a portion of the printed circuit board 505 is approximately parallel to the front face of the mating end of the contactless plug connector, and a first and a second of the at least one antenna element are mounted at a second predefined distance ($d_2$) on the portion of the PCB.

In other words, the portion of the printed circuit board 505 mounting the first and the second antenna element 510 and 520 is arranged in alignment to the front face within the mating end of the contactless plug connector 500. In particular, the portion of the printed circuit board 505 enables arranging the first and the second antenna element 510 and 520 equidistantly from the front face of the mating end of the contactless plug connector 500.

Further, the contactless plug connector 500 includes a transmitting/receiving circuit connected to the first and second antenna element 510 and 520 and an input/output for input of a baseband input signal and for output of a baseband output signal, which are, however, not shown in FIGS. 5a and 5b.

For the transmission operation, a baseband input signal is input via the input/output to the transmitting/receiving circuit of the contactless plug connector 500. The transmitting and/or receiving circuit modulates the baseband input signal on a first predetermined carrier frequency. Thereafter, the transmitting/receiving circuit outputs the modulated input signal to the first antenna element 510 so as to emit the modulated input signal as a radio wave of the first predetermined carrier frequency.

Similarly, for the reception operation, the transmitting and/or receiving circuit of contactless plug connector 500 receives via the second antenna element 520 a radio wave of the first predetermined carrier frequency. Thereafter, the transmitting and/or receiving circuit demodulates the received radio wave and outputs the demodulated radio wave as a baseband output signal to the input/output.

Advantageously, the arrangement of the printed circuit board 505 within the mating end of the contactless plug connector 500 allows for an implementation of the first and second antenna element 510 and 520 in which radio waves are transmitted from and/or received on the top face of the first and antenna element 510 and second antenna element 520. This implementation of the first and second antenna element 510 and 520 are advantageous when integrating circuitry within the housing of the first and second antenna element 510 and 520. In particular, this implementation of the first and second antenna element 510 and 520 may allow for an integration of functionality of the transmitting/receiving circuit within the first and/or second antenna element 510 and 520.

Similar to the contactless plug connector 100 of FIGS. 1a and 1b, the contactless plug connector 500 additionally includes a securing element for securing the mating end of the contactless plug connector 500 at close proximity to the corresponding mating end of the mating connector 560 such that an electromagnetic connection can be established with the corresponding mating connector 560. In more detail, the securing element is adapted to secure the mating end of the contactless plug connector 500 to the corresponding mating connector with a distance tolerance ($d_1$). The securing element has been omitted in FIGS. 5a and 5b for ease of illustration of the contactless plug connector 500.

The contactless plug connector 500 may additionally include the inductive coupling element for transmission/reception of power to/from the corresponding mating connector 560 as described with reference to the embodiment of FIGS. 1a and 1b. For conciseness reasons, the description of the inductive coupling element has been omitted in this embodiment.

In another detailed embodiment, the contactless plug connector 500 is adapted to allow transmission of power in both directions by including the inductive coupling element and the detector as described in the embodiment of FIGS. 1a and 1b. Then, the first and second predetermined carrier frequency may be configured depending on whether the detector of the contactless plug connector 500 detects that power is received via the input/output or via the inductive coupling element.

Similar to the embodiment shown in FIGS. 1a and 1b, the securing element of the contactless plug connector 500 may be adapted to allow the contactless plug connector 500 to be secured in a rotated state to the corresponding mating connector 560.

In order to allow the contactless plug connector 500 to transmit and/or receive radio waves to/from the corresponding mating connector when secured in an arbitrary rotated state, the first and second antenna element 510 and 520 is adapted to transmit and/or to receive radio waves with a circular polarization. According to an exemplary realization, the first antenna element 510 is adapted to transmit and/or receive right-handed circular polarized radio waves and the second antenna element 520 is adapted to receive and/or transmit left-handed circular polarized radio waves. Notwithstanding a particular type of circular polarization, an antenna element 510 or 520 of the contactless plug connector 500 is configured to transmit and/or receive via a type of circular polarization which is same to the type of circular polarization of the corresponding antenna element 565 or 570 of the mating plug connector 575 for establishing an electromagnetic connection.

Further, to allow the contactless plug connector 500 to transmit and/or receive power to/from the corresponding mating connector 560 when secured in an arbitrary rotated state, the optional inductive coupling element may require a particular configuration as described in the embodiment of FIGS. 1a and 1b.

In general, it can be readily appreciated that the mating connector 260, 360, 460, 560 can be realized in a similar manner as the contactless plug connector so as to allow for a two-way electromagnetic connection. In particular, the mating connector may also includes at least one antenna element 265, 365, 465, 565 and 270, 470, 570, a printed circuit board 275, 375, 475, 575, a reciprocal securing element and optionally a shielding layer 480 within the printed circuit board 275, 375, 475, 575 with the corresponding functionality and providing for the advantages as described with respect to the contactless plug connector of the above embodiments of the invention.

Further, it shall be noted that all embodiments of the invention described above can be readily combined with each other, for example when trying to improve the throughput between the contactless plug connector and a corresponding mating connector.

In another embodiment a contactless plug connector system is provided comprising the contactless plug connector according to any of the preceding embodiments of the invention and a corresponding mating connector, wherein, in the secured state, the at least one antenna element of the contactless plug connector being secured at the predetermined distance to corresponding mating connector so as to allow for an electromagnetic connection with the corresponding mating connector.

| Reference Numerals | |
|---|---|
| Reference Numerals | Description |
| 100, 200, 300, 400, 500 | contactless plug connector |
| 105, 205, 305, 405, 505 | Printed circuit board (PCB) |
| 110, 210, 310, 410, 510 | First antenna element |
| 115, 415 | Shielding layer |
| 120, 220, 320, 420, 520 | Second antenna element |
| 125 | Coil |
| 130 | Ferrite element |
| 135 | Securing element |
| 140 | Input/output |
| 145 | Shielding element |
| 150 | Sealing element |
| 155 | Transmitting/receiving circuit |
| 260, 360, 460, 560 | Mating connector |
| 265, 365, 465, 565 | First antenna element of mating connector |
| 270, 470, 570 | Second antenna element of mating connector |
| 275, 375, 475, 575 | Printed circuit board of mating connector |
| 480 | Shielding layer of mating connector |

The invention claimed is:

1. Contactless plug connector for electromagnetically connecting a corresponding mating connector, the contactless plug connector comprising:
    at least one antenna element arranged within a mating end of the contactless plug, and adapted to transmit and/or to receive radio waves modulated with a predetermined carrier frequency;
    a transmitting/receiving circuit for modulating an inputted baseband input signal onto the predetermined carrier frequency and transmitting the modulated baseband input signal via one of the at least one antenna element; and/or for demodulating a radio wave, received via one of the at least one antenna element, into a baseband output signal;
    a securing element for securing the mating end of the contactless plug connector at close proximity to a corresponding mating end of the mating connector such that an electromagnetic connection can be established with the corresponding mating connector;
    an inductive coupling element for transmitting/receiving power to/from a corresponding mating connector; wherein the inductive coupling element is arranged at the mating end of the contactless plug connector so as to form in the secured state an induction loop with a corresponding inductive coupling element of the mating connector; and
    a printed circuit board (PCB) on which the at least one antenna element and the transmitting/receiving circuit are mounted, wherein the PCB is arranged within the contactless plug connector at close proximity to the mating end of the contactless plug connector, and the PCB is arranged longitudinally within the contactless plug connector so as to subdivide a cross section of the mating end of the contactless plug connector into two segments; and a first and a second of the at least one antenna element are mounted on opposite sides of the PCB, such that:
        one of the two segments includes the first antenna element being adapted to transmit radio waves modulated with the first predetermined carrier frequency, and
        the other of the two segments includes the second antenna element being adapted to receive radio waves modulated with the first predetermined carrier frequency; and the transmitting/receiving circuit is adapted to modulate an inputted baseband input signal onto the first predetermined carrier frequency and transmit the modulated baseband input signal via the first antenna element and to demodulate a radio wave with the first predetermined carrier frequency, received via the second antenna element, into a baseband output signal; and wherein the PCB includes a layer realizing a conductive ground plane in an area of the PCB where the first and the second antenna element are mounted on opposite sides so as to shield the first antenna element from the second antenna element and vice versa.

2. The contactless plug connector according to claim 1, wherein the securing element is adapted to secure the mating end of the contactless plug connector to the corresponding mating connector with a distance tolerance ($d_1$) of no more than the diameter of the surface of the mating end of the contactless plug connector.

3. The contactless plug connector according to claim 1, wherein:

a first of the at least one antenna element is adapted to transmit radio waves modulated with a first predetermined carrier frequency;

a second of the at least one antenna element is adapted to receive radio waves modulated with a second predetermined carrier frequency; and the transmitting/receiving circuit is adapted to modulate an inputted baseband input signal onto the first predetermined carrier frequency and transmit the modulated baseband input signal via the first antenna element; and to demodulate a radio wave with the second predetermined carrier frequency, received via the second antenna element, into a baseband output signal;

allowing for simultaneous transmission and reception operations via the two antenna elements without interference therebetween.

4. The contactless plug connector according to claim 1, wherein:

the at least one antenna element is adapted to transmit and to receive radio waves modulated with the predetermined carrier frequency; and the transmitting/receiving circuit is adapted to alternatively (i) modulate and transmit an inputted baseband input signal, or (ii) receive and demodulate a radio wave with the predetermined carrier frequency according to a pre-defined time schedule enabling a transmission and a reception operation via the same antenna element without interference therebetween.

5. The contactless plug connector according to claim 1, wherein the transmitting/receiving circuit is connected to the inductive coupling element.

6. The contactless plug connector according to claim 1, wherein the inductive coupling element includes:

a coil with a predetermined diameter, and a ferrite element having a u-shaped cross-section and being arranged to surround the coil so as to enhance the transmission/reception of power to/from a corresponding mating connector; and wherein the securing element is adapted to secure the mating end of the contactless plug connector to the corresponding mating connector with a lateral misalignment tolerance of no more 25% of the coil diameter.

7. The contactless plug connector according to claim 1, wherein the contactless plug connector is provided as a radial connector;

the securing element is adapted to allow the contactless plug connector to be secured in a rotated state to the corresponding mating connector; and the at least one antenna element is adapted to transmit and/or to receive radio waves with a circular polarization.

8. The contactless plug connector according to claim 7, wherein a first of the at least one antenna elements is adapted to transmit radio waves with a left-handed polarization and a second of the at least one antenna elements is adapted to receive radio waves with a right-handed polarization.

9. A contactless plug connector system comprising a contactless plug connector according to claim 1 and a corresponding mating connector, wherein, in the secured state, the at least one antenna element of the contactless plug connector being secured at a predetermined distance to corresponding mating connector so as to allow for an electromagnetic connection with the corresponding mating connector.

10. Contactless plug connector for electromagnetically connecting a corresponding mating connector, the contactless plug connector comprising:

at least one antenna element arranged within the mating end of the contactless plug connector and adapted to transmit and/or to receive radio waves modulated with a predetermined carrier frequency;

a transmitting/receiving circuit for modulating an inputted baseband input signal onto the predetermined carrier frequency and transmitting the modulated baseband input signal via one of the at least one antenna element; and/or for demodulating a radio wave, received via one of the at least one antenna element, into a baseband output signal;

a securing element for securing the mating end of the contactless plug connector at close proximity to a corresponding mating end of the mating connector such that an electromagnetic connection can be established with the corresponding mating connector; and a printed circuit board (PCB) on which the at least one antenna element and the transmitting/receiving circuit are mounted, wherein the PCB is arranged within the contactless plug connector at close proximity to the mating end of the contactless plug connector, and the PCB is arranged longitudinally within the contactless plug connector so as to subdivide a cross section of the mating end of the contactless plug connector into two segments; and a first and a second of the at least one antenna element are mounted on opposite sides of the PCB such that:

one of the two segments includes the first antenna element being adapted to transmit radio waves modulated with the first predetermined carrier frequency, and the other of the two segments includes the second antenna element being adapted to receive radio waves modulated with the first predetermined carrier frequency; and the transmitting/receiving circuit is adapted to:

modulate an inputted baseband input signal onto the first predetermined carrier frequency and transmit the modulated baseband input signal via the first antenna element; and demodulate a radio wave with the first predetermined carrier frequency, received via the second antenna element, into a baseband output signal.

* * * * *